United States Patent
Savelle, Jr. et al.

(10) Patent No.: US 7,717,475 B2
(45) Date of Patent: May 18, 2010

(54) HEXPIPE BARBED FITTING

(75) Inventors: William C. Savelle, Jr., Mckinney, TX (US); Ronald James Morrison, Gunter, TX (US)

(73) Assignee: Telsco, Industries, Inc., Garland, TX (US)

( * ) Notice: Subject to any disclaimer, the term of this patent is extended or adjusted under 35 U.S.C. 154(b) by 0 days.

(21) Appl. No.: 12/150,202

(22) Filed: Apr. 24, 2008

(65) Prior Publication Data

US 2009/0267341 A1    Oct. 29, 2009

(51) Int. Cl.
*F16L 43/00* (2006.01)
(52) U.S. Cl. .................. 285/179; 285/39; 285/239
(58) Field of Classification Search .............. 285/39, 285/239, 179, 190
See application file for complete search history.

(56) References Cited

U.S. PATENT DOCUMENTS

| | | | | |
|---|---|---|---|---|
| 199,784 A | * | 1/1878 | Brumbaugh | 285/251 |
| 615,509 A | * | 12/1898 | Stevens | 285/190 |
| 1,712,130 A | * | 5/1929 | Battenfeld | 285/190 |
| 2,314,001 A | * | 3/1943 | Lusher et al. | 285/256 |
| 2,460,622 A | * | 2/1949 | Crawley | 285/130.1 |
| 2,489,441 A | * | 11/1949 | Doyle | 285/98 |
| 3,416,818 A | * | 12/1968 | Conlin | 285/39 |
| 3,486,771 A | * | 12/1969 | Conlin | 285/39 |
| 3,967,838 A | * | 7/1976 | Legris | 285/190 |
| 4,092,002 A | | 5/1978 | Grosse et al. | |
| 4,288,103 A | * | 9/1981 | Gallagher et al. | 285/39 |
| D282,772 S | * | 2/1986 | Fleury | D23/263 |
| 4,703,957 A | * | 11/1987 | Blenkush | 285/239 |
| 4,795,100 A | | 1/1989 | Purtell et al. | |
| 5,215,335 A | * | 6/1993 | Hamm, Jr. | 285/39 |
| 5,335,944 A | * | 8/1994 | Mitsui et al. | 285/133.3 |
| 5,507,536 A | | 4/1996 | Oliveto, II et al. | |
| 5,553,786 A | | 9/1996 | Israel | |
| 5,634,673 A | * | 6/1997 | Miyazaki et al. | 285/148.5 |

(Continued)

FOREIGN PATENT DOCUMENTS

EP           534042 A1 *  3/1993

OTHER PUBLICATIONS

Blu-Lock™, Product Specification Sheet, Blu-Lock™ Manfacturing Products, Bountiful, UT, (2 pages).

(Continued)

*Primary Examiner*—David E Bochna
(74) *Attorney, Agent, or Firm*—Rudolph J. Buchel, Jr.

(57) ABSTRACT

An elbow barbed fitting for use with flexible pipe and the like is provided with a barbed fitting drive cap for cooperating with a compatible drive tool, such as a socket or nut driver. The barbed fitting drive cap is configured as a hexagonal cap, square cap, star cap or other common driver shapes. The barbed fitting drive cap is positioned on the fitting body opposite the opening to the barbed end, but coaxially aligned with the barb. The cross-sectional body width of the barbed fitting drive cap is narrower than a corresponding width of the fitting body for exerting a drive force on the fitting body. Alternatively, the elbow barbed fitting is provided with a drive recess configured as a hexagonal recess, slotted recess, cross point recess, square recess, star recess or other common driver shapes for cooperating with a compatible driver. Common elbow fitting types include 90° or 45° ells.

27 Claims, 3 Drawing Sheets

U.S. PATENT DOCUMENTS

| | | | |
|---|---|---|---|
| 5,823,580 | A | 10/1998 | Ungerecht |
| 6,056,325 | A * | 5/2000 | Bernard .................... 285/39 |
| 6,109,659 | A * | 8/2000 | Heidenreich et al. ......... 285/13 |
| 6,231,085 | B1 | 5/2001 | Olson |
| 6,530,604 | B1 * | 3/2003 | Luft et al. ................. 285/190 |
| 6,539,715 | B2 * | 4/2003 | Julazadeh et al. ............ 60/602 |
| 6,609,733 | B2 * | 8/2003 | Gilmore .................... 285/239 |
| 6,871,880 | B1 | 3/2005 | Olson |
| 6,899,355 | B2 | 5/2005 | Klein et al. |
| 2004/0183302 | A1 | 9/2004 | Allen et al. |
| 2006/0006643 | A1 | 1/2006 | Schultz |
| 2006/0248702 | A1 | 11/2006 | Nikolaidis et al. |

OTHER PUBLICATIONS

Swing pipe tubing and Fittings, Products Sheet, Rain Bird Corporation, Tucson, AZ, Mar. 2008, (2 Pages).

Smart Solutions for the Professional, 2007 Catalog of Products, Sprinkle Accessories, Weathermatic Corporation, Garland, TX, p. 12 2007.

* cited by examiner

HEXPIPE BARBED FITTING

BACKGROUND OF THE INVENTION

The present invention relates generally to irrigation water supply. More particularly, the present invention relates to an improved barbed fitting for use with low density polyethylene irrigation pipe and the like.

Low density polyethylene pipe has been used as a water conduit in special applications for decades. Low density polyethylene pipe is generally flexible and extremely resilient, is capable of withstanding working pressures of 100 PSI and greater and is not reactant in most environments. Because of resilience, low density polyethylene pipe has been the pipe of choice for use in irrigation systems, particularly as a subterranean riser.

Typical PVC supply lines for irrigation systems are installed in a trench, with only the tops of sprinkler heads exposed above grade. An in-line connection is installed in the PVC supply line for each sprinkler, the connection is combination fitting (usually a threaded T-fitting) having at least one PVC slip joint and a threaded joint for coupling a sprinkler head or the like. In a typical irrigation system installation, lawn sprinklers are connected to the PVC supply pipe via a vertical riser pipe and the supply pipe lines at the bottom of the trench. The vertical riser is connected to the threaded T-fitting on the PVC pipe and another pipe thread on the sprinkler. The sprinklers are positioned directly over the rigid riser and the PVC supply pipe, and the trench is backfilled with the sprinkler head exposed. Although this is an extremely efficient installation technique, it suffers from a high instance of post installation pipe damage because of the configuration. After installation, if pressure is placed on the sprinkler head, such as by a person walking on the sprinkler or a vehicle driving over it, the force of the weight is transferred vertically through the traditional riser (from the sprinkler) and is absorbed by the PVC pipe and connection fitting. This often results in a catastrophic breakage of the PVC pipe at the fitting, the fitting itself or both.

This problem is overcome by replacing the riser in the installation with a flexible swing pipe of low density polyethylene pipe that will absorb much of the downward force from a pedestrian, lawn mower, golf cart or even a vehicle on the sprinkler. In a typical installation, a polyethylene swing pipe is connected between a pair of adapters such that the sprinkler head is not positioned directly over the PVC supply line, therefore, these adapters are usually in a Tee or ell (elbow) configuration. Flexible polyethylene pipe will not accept pipe threads and hold the working pressure of an irrigation system. Therefore, polyethylene pipe must be connected to an adapter with threaded and barbed ends. The threaded end of the adapter screws into threaded sprinkler and/or threaded in-line Tee-fitting pipe just as the riser. The barbed end has angled barbs that grab and hold on to the inner surface of the polyethylene pipe and is forced into the polyethylene swing pipe. Barbed fittings are inexpensive and form a watertight and permanent seal without using glue or pipe clamps.

The barrel of the barbed end of the adapter has an outer diameter that is slightly larger (nominally 0.5 inch) than the inner diameter of the polyethylene swing pipe (nominally 0.49 inch) with several circular rows of angled barbs that protrude from the barrel between $1/16$ inch (0.0675 inch) and $3/16$ inch (0.1875 inch). During installation, the barbed end is manually forced into polyethylene swing pipe, usually by an inch or more, to ensure a water tight and permanent connection to the swing pipe. Often, the amount of force necessary to seat the polyethylene swing pipe around the barb is significant. Thick-wall and high pressure swing pipe are particularly problematic as they are usually much more rigid than standard-duty polyethylene swing pipe. Even standard-duty pipe can be difficult to seat in temperatures below 50° F.

BRIEF SUMMARY OF THE INVENTION

The present invention relates to an improved barbed fitting for use with low density polyethylene irrigation pipe and the like. A combination barbed fitting is provided with a drive cap for cooperating with a compatible tool, such as a socket or nut driver. The drive cap may be configured as a hexagonal cap, square cap, star cap or other common driver shapes. The drive cap is positioned on a fitting opposite the opening to the barbed end, but aligned coaxially with the barb. Common fitting types include ells (90° or 45°) and Tees. Alternatively, combination barbed fitting is provided with a drive recess for cooperating with a compatible driver. The drive recess may be configured as a hexagonal recess, slotted recess, cross point recess, square recess, star recess or other common driver shapes.

BRIEF DESCRIPTION OF THE SEVERAL VIEWS OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

Other features of the present invention will be apparent from the accompanying drawings and from the following detailed description.

DETAILED DESCRIPTION OF THE INVENTION

Element Reference Number Designations

Figure 1:
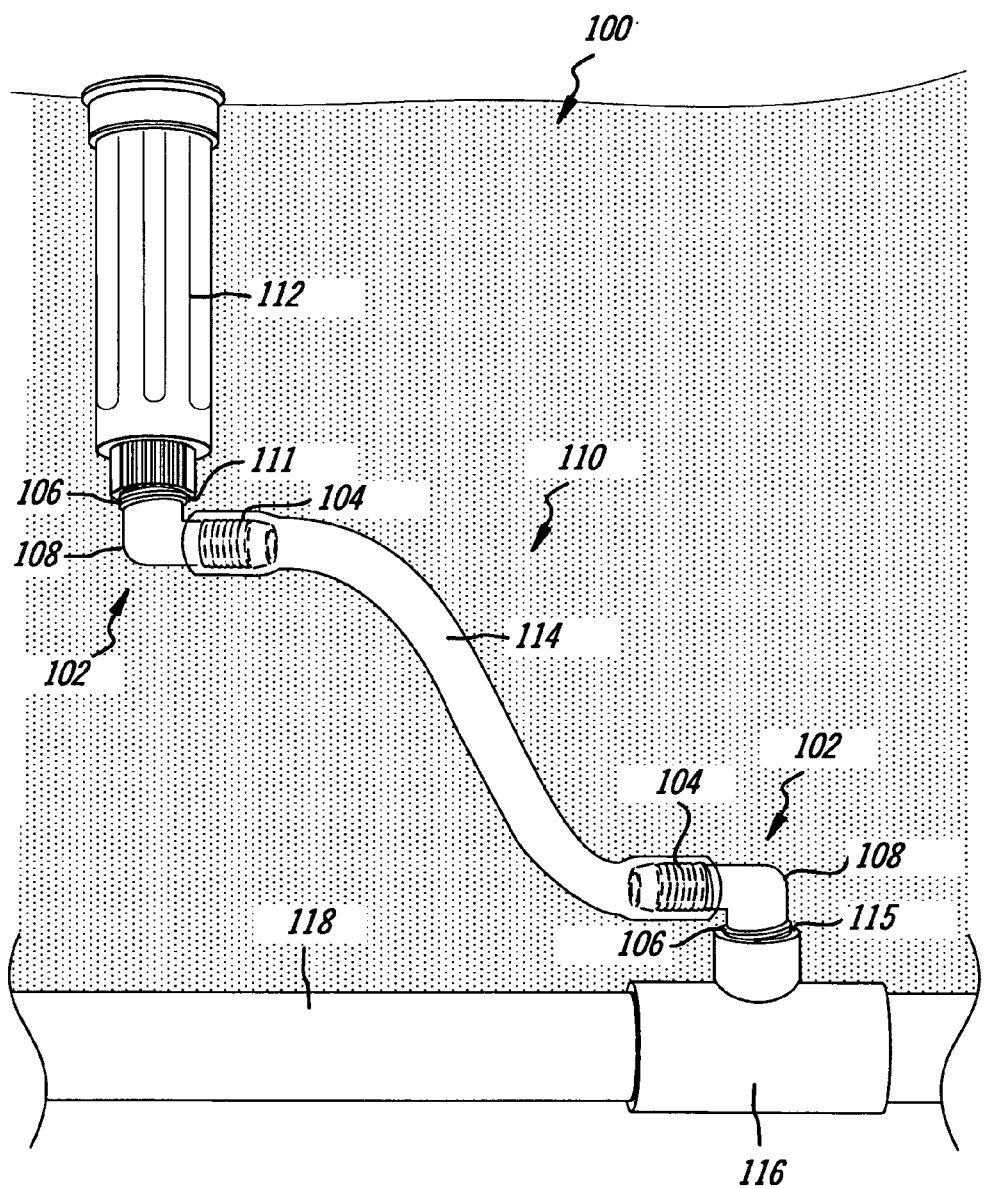
FIG. 1 is a diagram of a typical swing pipe installation for connecting a PVC irrigation supply pipe to a sprinkler head as is known in the prior art.

100: Swing pipe installation
102: Combination fitting
104: Male barbed connection
106: Pipe threaded connection
108: Fitting body
110: Swing pipe assembly
111: Female pipe threaded connection
112: Sprinkler head
114: Flexible swing pipe
115: Female pipe threaded connection
116: Combination Tee fitting
118: PVC water supply pipe 202: Hexpipe barbed fitting
204: Barbed connection
206: Pipe threaded connection
208: Fitting body
210: Drive cap
212: Hexagonal cap
214: Hexagonal recess (hex head)
216: Center axis of barrel
310: Drive cap
314: Slotted recess (flat head)
410: Drive cap
414: Cross point recess FIG. 1 is a diagram of a typical swing pipe installation for connecting a PVC irrigation supply pipe to a sprinkler head as is known in the prior art. Initially, a trench is dug at least a foot deep and PVC irrigation supply pipe 118 with a plurality of combination fittings 116 (usually PVC or ABS plastic) is laid. The figure depicts the fitting as a Tee, however a typical irrigation zone is usually terminating with a single ell combination fitting (not shown). As used hereinafter, a combination fitting usually refers to an adapter for dissimilar connections, such as a fitting with combination barbed connector and threaded connector, or a fitting with combination slip connector and threaded connector. Each of combination fittings 116 has an open thread pipe connection 115, usually female, for receiving a connection to sprinkler head 112, the open connector that is usually capped, temporarily, to avoid introducing of contaminants in the irrigation system. The figure depicts combination fittings 116 with threaded connection 115 oriented in an upward direction, however, in some installations threaded connection 115 is turned to the side of PVC irrigation supply pipe 118 (not shown). Swing pipe assembly 110 is usually made onsite by the installer from a length of flexible swing pipe 114 (such as a low density polyethylene line) and two combination fittings 102 with barbed connection ends (assemblies are also available premade from manufacturers, such as SmartPipe™ swing assemblies from Telsco Industries, Inc. of Garland, Tex.). Combination fittings 102 usually comprise ell-shaped (or elbow) fitting body 108 with connections on either ends; one connection with male threaded connection 106 for coupling to combination pipe threaded fitting 111 of sprinkler head 112 or to pipe threaded fitting 115 of PVC combination Tee fitting 116 (each may different be sizes, e.g., ½ inch (0.5 inch), ¾ inch (0.75 inch)) and a second commonly sized connection with barbed connection 104 for insertion into either end of flexible swing pipe 114.

In assembling the swing pipe assembly 110, the installer cuts a piece of polyethylene line to a desired length swing pipe 114 and forces barbed fittings 102 on either end. This is usually the most difficult task of the operation for the installer because angled barbs on the barrel of combination barbed fitting 102 extend well beyond the inner diameter of flexible swing pipe 114. Insertion may be accomplished by aligning barbed connection 104 with an open end of swing pipe 114 and then simultaneously forcing barbed connection 104 inward toward swing pipe 114 while twisting barbed fitting 102 in a back and forth rocking motion. Often, swing pipe 114 is fairly rigid and the installer lacks the physical strength necessary for gripping combination barbed fitting 102 and muscling it into swing pipe 114.

Installers may try several insertion techniques. First, the installer may attempt to merely hold combination barbed fitting 102 with a hand tool, such as pliers, and force the angled barbs for connection 104 into swing pipe 114. This technique usually proves to be less than satisfactory as the installer usually cannot achieve the combination of inward force and torque necessary for insertion. Additionally, the installer must use extreme care not to damage exposed pipe threads 106 with the pliers. Other techniques are intended to maximize leverage. One involves placing pipe threads 106 onto a lever arm that can be used to increase the torque for the back and forth rocking motion necessary for insertion. A length of PVC pipe with a threaded coupling is often used as a lever arm (or a discarded sprinkler body). The installer can usually maximize torque in the clockwise direction, although it is not always possible in the counterclockwise because the tool unscrews from pipe threads 106. Furthermore, since the installer must grip the tool near the distal end of the lever arm, she usually can not exert the same amount of inward force as without using the tool. Still another technique involves heating swing pipe 114 in order to make it more pliable, hence less resistant to barbed connection 104, but without damaging the polyethylene line. Some manufacturers suggest immersing swing pipe 114 into warm water in order to soften the polyethylene. Of course, warm water is rarely available at a jobsite so installers improvise by using other heating sources that are readily available, such as butane lighters or soldering torches. While an open flame will soften the polyethylene line, the amount of heat applied to the line is difficult to control. Also, open flame heating sources often heat the polyethylene unevenly causing blistering. Furthermore, excessive heating of the polyethylene will cause the affected area to become brittle and result in a general lack of resilience of the material. This condition may go unnoticed until several months following the installation when swing pipes begin popping off of the barbed fittings.

Due to the shortcoming of prior art barbed fittings, manufacturers sometimes offer pre-assembled swing pipe assemblies. Pre-assembled swing pipe assemblies overcome the insertion problems of the prior art, but are more expensive and must be ordered from stock swing pipe lengths, rather than cutting the swing pipe to a specific length on the jobsite. Also, several alternatives to barbed fittings have recently been introduced for use with low density polyethylene line, including the Blu-Lock™ flexible pipe fitting available from Blu-Lock Manufacturing Products in Bountiful, Utah. These fittings also overcome the insertion problems of the prior art, but are extremely expensive in comparison with prior art barbed fittings.

Figure 2:
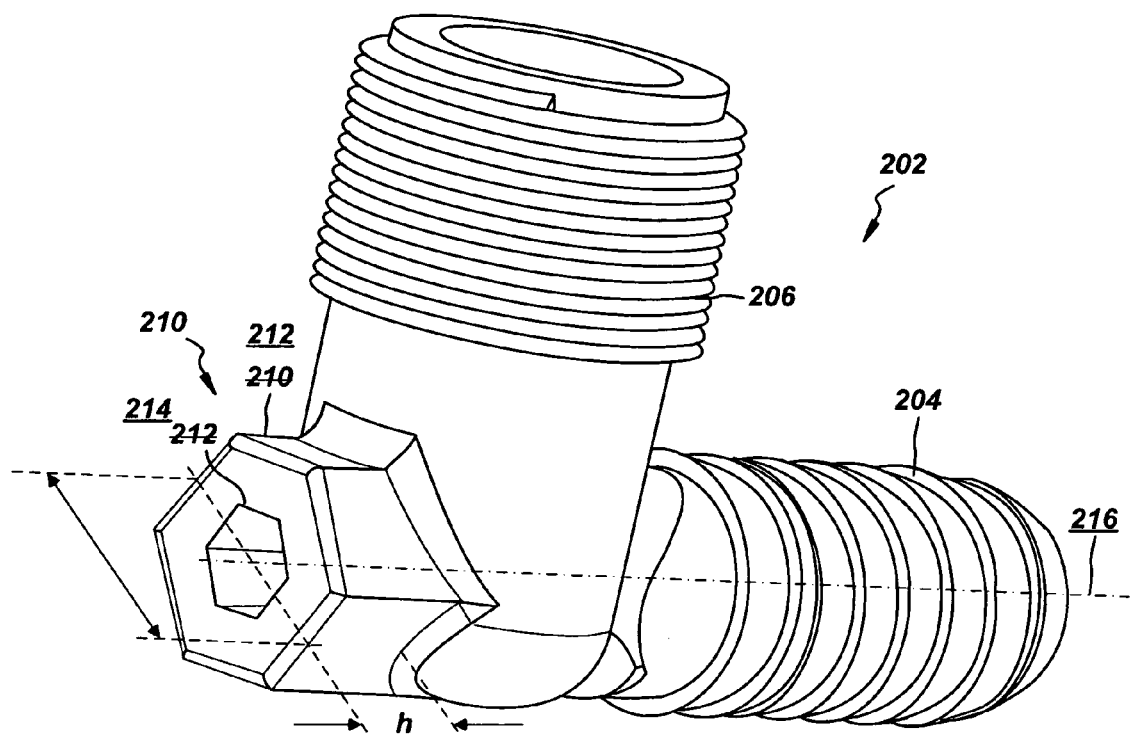
FIG. 2 is a diagram of a hexpipe barbed fitting in accordance with an exemplary embodiment of the present invention.

In view of the forgoing, a hexpipe barbed fitting is disclosed herein. FIG. 2 is a diagram of a hexpipe barbed fitting in accordance with an exemplary embodiment of the present invention. Hexpipe barbed fitting 202 is similar to prior art barbed fitting in that hexpipe barbed fitting 202 has disposed thereon male threaded connection 206, barbed connection 204, and fitting body 208 connected there between. Fitting body 208 may be relatively small, comprising little more than a connection stricture between the respective connections. Barbed connection 204 may comprise a standard barb having a plurality of circularly shaped angle barbs, or may instead be a spiral barb, such as the SmartPipe™ twist-in type barbed fitting available from Telsco. Each connection is generally cylindrical in shape along a unique axis, the axis of the barbed connection is shown as axis 216. Hexpipe barbed fitting 202 is fabricated from high strength, high-density polyethylene (HDPE) or the like. The distinction between hexpipe barbed fitting 202 and a prior art barbed fitting is the presently described hexpipe fitting comprises integral drive cap 210 disposed on an outer surface of fitting body 208 along barb axis 216. The inclusion of drive cap 210 provides a prior art barbed fitting with a means for accepting and cooperating with an insertion tool, a compatible socket or the like. Furthermore, drive cap 210 gives barbed fitting 202 a tool vantage point for simultaneously applying enough inward and lateral forces for inserting the angled barbs into even the most rigid low density polyethylene swing pipe. Hence, drive cap 210 should be positioned on a fitting opposite the opening to the barbed end, coaxially with the barb. Drive cap 210 is depicted on a combination ell barbed fitting, but may disposed on other types of compatible combination fittings, such as a Tee, where the conditions described above may be enforced.

As depicted in the figure, drive cap 210 comprises a hexagonal cap 212, for cooperating with a compatibly sized removable six- or twelve-point socket, or the like. As may be appreciated, the socket may be fitted to any appropriate driver, such as a ratchet, T-handle or screwdriver, for applying an inwardly directed insertion force while rotating barbed fitting 202 into a swing pipe. As such, drive cap 210 should be sufficiently strong to prevent unintentional shearing from the body of the fitting. Optimally, the diameter, d, of hexagonal cap 212 should be wide enough to accept the high torque from the driver, but no wider than the body of the fitting, for instance between ¼ inch (0.25 inch) and ¾ inch (0.75 inch). Additionally, the height, h, of hexagonal cap 212 should be tall enough to prevent rounding the hexagonal shape and to prevent a socket from slipping off of the cap.

One advantage of employing hexagonal cap 212 is the wide range of compatible tools that are readily available to the installer at a jobsite, however, other types of caps are possible, such as square or star. Moreover, the cost of producing a barbed fitting with hexagonal cap 212 is virtually equivalent to manufacturing prior art barb fittings. Another advantage is that hexagonal cap 212 affords the opportunity to use power tools for the insertion, such as a cordless drill/driver. Using a power tool for insertions is particularly useful with spiral barbs for twist-in insertions, therefore, and in accordance with another exemplary embodiment of the present invention, barbed fitting 202 comprises a spiral barb for twist-in insertions. Hence, the present invention is applicable to barbed fittings with more than a single barbed connection.

Figure 3:
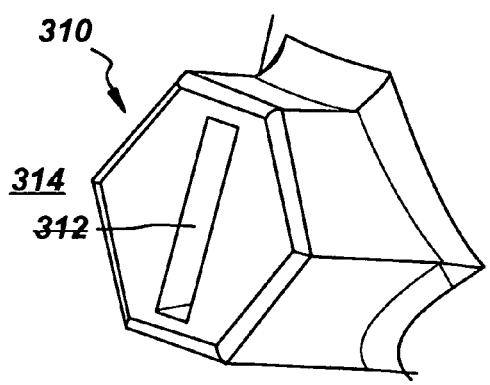
FIG. 3 is a diagram of a barbed fitting with a slotted recess in accordance with an exemplary embodiment of the present invention.
Figure 4:
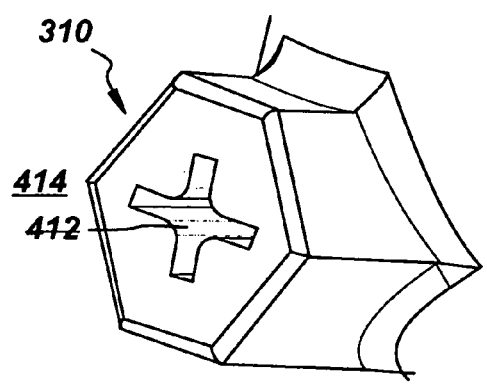
FIG. 4 is a diagram of a barbed fitting with a cross point recess in accordance with an exemplary embodiment of the present invention.
Figure 5:
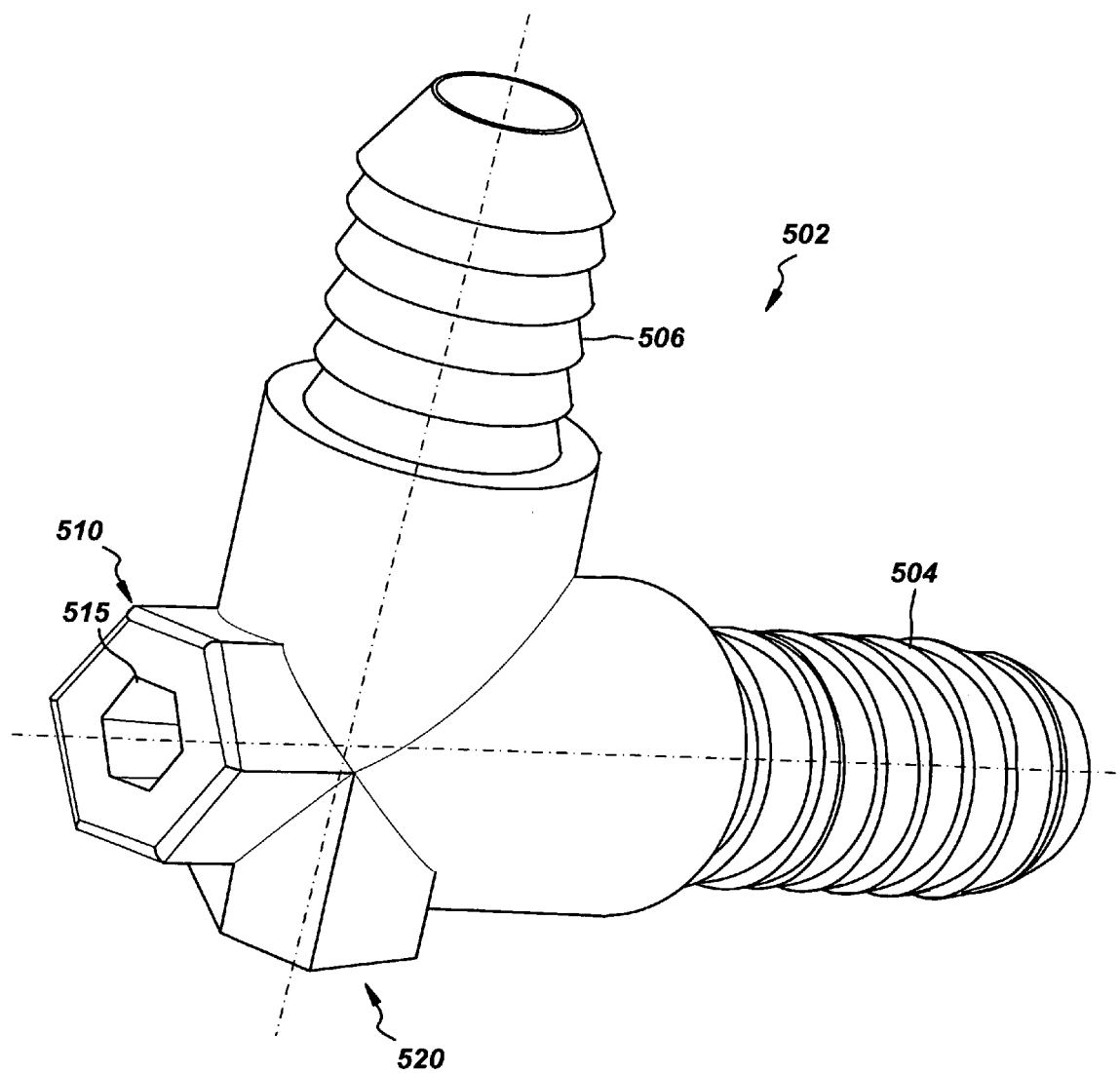
FIG. 5 is a diagram of a hexpipe barbed fitting with two drive caps in accordance with an exemplary embodiment of the present invention.

In accordance with other exemplary embodiments of the present invention, drive cap 210 is configured with a recessed drive for cooperating with compatibly sized drivers in an identical manner as discussed above for drive cap 210. The recessed drive may be configured as a hex or Allen type, depicted as hexagonal recess 214, for use with a hex driver. Here it should be mentioned, however, the ratio of hex size to the diameter d should yield a sufficiently thick wall to withstand the insertion torque. Additionally, hex drives are favored where the application of moderate torque is necessary, such as may be necessary for inserting barbed fittings on swing pipe. Other types of recessed drives are also possible, such as slotted (or flat point), see slotted recess 314 in FIG. 3, a cross point recess such as Phillips or Freason, see cross point recess 414 in FIG. 4, square recess, star recess such as Torx, star or triple square, to mention a few. Although these are depicted in the figures disposed on a hexagonal cap, the caps cross-sectional is unrelated to the shape of the recess, optionally, the drive cap may have a non-utilitarian shape, such as round. Additionally, and as depicted in FIG. 5, elbow barbed fitting 502 with barbed connections 504 and 506 maybe configured with a pair of drive caps 510 and 520, coaxially with the respective barbed connections 504 and 506. Each of drive caps 510 and 520 may be further configured with a drive recess, such as hexagonal recess 514.

The exemplary embodiments described below were selected and described in order to best explain the principles of the invention and the practical application, and to enable others of ordinary skill in the art to understand the invention for various embodiments with various modifications as are suited to the particular use contemplated. The particular embodiments described below are in no way intended to limit the scope of the present invention as it may be practiced in a variety of variations and environments without departing from the scope and intent of the invention. Thus, the present invention is not intended to be limited to the embodiment shown, but is to be accorded the widest scope consistent with the principles and features described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A barbed elbow fitting for use with flexible conduit, comprising:
    a first connection having a generally cylindrical shape along a first axis with a first outer surface, a first opening at a first distal end and an angled barb disposed on the first outer surface;
    a second connection having a generally cylindrical shape along a second axis with a second outer surface and a second opening at a second distal end, the second axis of the second connection being nonparallel to the first axis of the first connection;
    a fitting body connected to the first and second connections, said fitting body having an interior volume between the first and second openings and an outer surface; and
    a barbed fitting drive cap for cooperating with a drive tool, said barbed fitting drive cap integrally formed on the outer surface of the fitting body opposite the first opening at the first distal end of the first connection, coaxially with the first axis and comprising a body, a top surface and an outer surface, wherein said body having a cross-sectional width narrower than a corresponding width of the fitting body, whereby a drive force exerted from a drive tool in a direction of the first axis toward the fitting body is received at the outer surface of the fitting body.

2. The barbed elbow fitting for use with flexible conduit recited in claim 1, wherein the body of the barbed fitting drive cap further comprises:
a hexagonal cross-sectional shape for cooperating with a drive tool having correspondingly hexagonal shaped opening.

3. The barbed elbow fitting for use with flexible conduit recited in claim 2, wherein the barbed fitting drive cap further comprises:
a drive recess through the top surface and into the body of the barbed fitting drive cap for cooperating with a drive tool having correspondingly shaped drive.

4. The barbed elbow fitting for use with flexible conduit recited in claim 3, wherein the drive recess through the top surface and into the body for cooperating with a drive tool further comprises:
a hexagonal cross-sectional shape cooperating with a hexagonal drive.

5. The barbed elbow fitting for use with flexible conduit recited in claim 3, wherein the drive recess through the top surface and into the body for cooperating with a drive tool further comprises:
a rectangular cross-sectional shape for cooperating with a flat point drive.

6. The barbed elbow fitting for use with flexible conduit recited in claim 3, wherein the drive recess through the top surface and into the body for cooperating with a drive tool further comprises:
a crossed cross-sectional shape for cooperating with a cross point drive.

7. The barbed elbow fitting for use with flexible conduit recited in claim 3, wherein the drive recess through the top surface and into the body for cooperating with a drive tool further comprises:
a square cross-sectional shape for cooperating with a square drive.

8. The barbed elbow fitting for use with flexible conduit recited in claim 3, wherein the drive recess through the top surface and into the body for cooperating with a drive tool further comprises:
a star cross-sectional shape for cooperating with a star drive.

9. The barbed elbow fitting for use with flexible conduit recited in claim 1, wherein the body of the barbed fitting drive cap further comprises:
one of a square cross-sectional shape, rectangular cross-sectional shape and star cross-sectional shape for cooperating with a drive tool having correspondingly shaped opening.

10. The barbed elbow fitting for use with flexible conduit recited in claim 1, wherein the barbed fitting drive cap further comprises:
a drive recess through the top surface and into the body of the barbed fitting drive cap for cooperating with a drive tool having correspondingly shaped drive.

11. The barbed elbow fitting for use with flexible conduit recited in claim 10, wherein the drive recess through the top surface and into the body of the barbed fitting drive cap for cooperating with a drive tool further comprises:
a hexagonal cross-sectional shape cooperating with a hexagonal drive.

12. The barbed elbow fitting for use with flexible conduit recited in claim 10, wherein the drive recess through the top surface and into the body of the barbed fitting drive cap for cooperating with a drive tool further comprises:
a rectangular cross-sectional shape for cooperating with a flat point drive.

13. The barbed elbow fitting for use with flexible conduit recited in claim 10, wherein the drive recess through the top surface and into the body of the barbed fitting drive cap for cooperating with a drive tool further comprises:
a crossed cross-sectional shape for cooperating with a cross point drive.

14. The barbed elbow fitting for use with flexible conduit recited in claim 10, wherein the drive recess through the top surface and into the body of the barbed fitting drive cap for cooperating with a drive tool further comprises:
a square cross-sectional shape for cooperating with a square drive.

15. The barbed elbow fitting for use with flexible conduit recited in claim 10, wherein the drive recess through the top surface and into the body of the barbed fitting drive cap for cooperating with a drive tool further comprises:
a star cross-sectional shape for cooperating with a star drive.

16. The barbed elbow fitting for use with flexible conduit recited in claim 1, wherein the second connection further comprises:
a pipe threaded connection.

17. The barbed elbow fitting for use with flexible conduit recited in claim 1, wherein the second connection having the generally cylindrical shape alone the second axis with the second outer surface and the second opening at the second distal end, the second axis of the second connection being nonparallel to the first axis of the first connection, further comprises an angled barb disposed on the second outer surface, wherein the barbed fitting further comprises:
a second barbed fitting drive cap for cooperating with a drive tool, said second barbed fitting drive cap disposed on the outer surface of the fitting body opposite the second opening at the second distal end of the second connection, coaxially with the second axis and comprising a body, a top surface and an outer surface, wherein said body having a cross-sectional width narrower than a corresponding width of the fitting body, whereby a drive force exerted from the drive tool in a direction of the second axis toward the fitting body is received at the outer surface of the fitting body.

18. The barbed elbow fitting for use with flexible conduit recited in claim 17, wherein said angled barb disposed on one of the first outer surface and the second outer surface of the respective first connection and second connection further comprises:
a spiral barb.

19. The barbed elbow fitting for use with flexible conduit recited in claim 1, wherein the angled barb disposed on the first outer surface of first connection further comprises:
a spiral barb.

20. The barbed elbow fitting for use with flexible conduit recited in claim 1, wherein the barbed elbow fitting is one of a ninety degree elbow or a forty-five degree elbow.

21. A barbed elbow fitting for use with flexible conduit, comprising:
a first connection having a generally cylindrical shape along a first axis with a first outer surface, a first opening at a first distal end and an angled barb disposed on the first outer surface;
a second connection having a generally cylindrical shape along a second axis with a second outer surface and a second opening at a second distal end, the second axis of the second connection being nonparallel to the first axis of the first connection;

a fitting body connected to the first and second connections, said fitting body having an interior volume between the first and second openings and an outer surface; and a barbed fitting drive cap integrally formed on the outer surface of the fitting body, opposite the first opening at distal end of the first connection and along the first axis for cooperating with a drive tool, said barbed fitting drive cap comprising:

a body:

an outer surface; and a top surface with a hexagonal cross-sectional shaped drive recess extending into the body, for cooperating with a hexagonal drive—drive tool.

22. A barbed elbow fitting for use with flexible conduit, comprising:

a first connection having a generally cylindrical shape along a first axis with a first outer surface, a first opening at a first distal end and an angled barb disposed on the first outer surface;

a second connection having a generally cylindrical shape along a second axis with a second outer surface and a second opening at a second distal end, the second axis of the second connection being nonparallel to the first axis of the first connection;

a fitting body connected to the first and second connections, said fitting body having an interior volume between the first and second openings and an outer surface; and a barbed fitting drive cap integrally formed on the outer surface of the fitting body, opposite the first opening at distal end of the first connection and along the first axis for cooperating with a drive tool, said barbed fitting drive cap comprising:

a body:

an outer surface; and a top surface with a rectangular cross-sectional shaped drive recess extending into the body, for cooperating with a rectangular drive—drive tool.

23. A barbed elbow fitting for use with flexible conduit, comprising:

a first connection having a generally cylindrical shape along a first axis with a first outer surface, a first opening at a first distal end and an angled barb disposed on the first outer surface;

a second connection having a generally cylindrical shape along a second axis with a second outer surface and a second opening at a second distal end, the second axis of the second connection being nonparallel to the first axis of the first connection;

a fitting body connected to the first and second connections, said fitting body having an interior volume between the first and second openings and an outer surface; and a barbed fitting drive cap integrally formed on the outer surface of the fitting body, opposite the first opening at distal end of the first connection and along the first axis for cooperating with a drive tool, said barbed fitting drive cap comprising:

a body:

an outer surface; and a top surface with a crossed cross-sectional shape drive recess extending into the body, for cooperating with a cross point drive—drive tool.

24. A barbed elbow fitting for use with flexible conduit, comprising:

a first connection having a generally cylindrical shape along a first axis with a first outer surface, a first opening at a first distal end and an angled barb disposed on the first outer surface;

a second connection having a generally cylindrical shape along a second axis with a second outer surface and a second opening at a second distal end, the second axis of the second connection being nonparallel to the first axis of the first connection;

a fitting body connected to the first and second connections, said fitting body having an interior volume between the first and second openings and an outer surface; and a barbed fitting drive cap integrally formed on the outer surface of the fitting body, opposite the first opening at distal end of the first connection and along the first axis for cooperating with a drive tool, said barbed fitting drive cap comprising:

a body:

an outer surface; and a top surface with a crossed cross-sectional shape drive recess extending into the body, for cooperating with a cross point drive—drive tool.

25. A barbed elbow fitting for use with flexible conduit, comprising:

a first connection having a generally cylindrical shape along a first axis with a first outer surface, a first opening at a first distal end and an angled barb disposed on the first outer surface;

a second connection having a generally cylindrical shape along a second axis with a second outer surface and a second opening at a second distal end, the second axis of the second connection being nonparallel to the first axis of the first connection;

a fitting body connected to the first and second connections, said fitting body having an interior volume between the first and second openings and an outer surface; and a barbed fitting drive cap integrally formed on the outer surface of the fitting body, opposite the first opening at distal end of the first connection and along the first axis for cooperating with a drive tool, said barbed fitting drive cap comprising:

a body:

an outer surface; and a top surface with a square cross-sectional shape drive recess extending into the body, for cooperating a square drive—drive tool.

26. A barbed elbow fitting for use with flexible conduit, comprising:

a first connection having a generally cylindrical shape along a first axis with a first outer surface, a first opening at a first distal end and an angled barb disposed on the first outer surface;

a second connection having a generally cylindrical shape along a second axis with a second outer surface and a second opening at a second distal end, the second axis of the second connection being nonparallel to the first axis of the first connection;

a fitting body connected to the first and second connections, said fitting body having an interior volume between the first and second openings and an outer surface; and a barbed fitting drive cap integrally formed on the outer surface of the fitting body, opposite the first opening at distal end of the first connection and along the first axis for cooperating with a drive tool, said barbed fitting drive cap comprising:
a body:
an outer surface; and
a top surface with a star cross-sectional shape drive recess extending into the body, for cooperating a star drive—drive tool.

27. A barbed elbow fitting for use with flexible conduit, comprising:
a first connection having a generally cylindrical shape along a first axis with a first outer surface, a first opening at a first distal end and an angled barb disposed on the first outer surface;
a second connection having a generally cylindrical shape along a second axis with a second outer surface and a second opening at a second distal end, the second axis of the second connection being nonparallel to the first axis of the first connection;
a fitting body connected to the first and second connections, said fitting body having an interior volume between the first and second openings and an outer surface;
a barbed fitting drive cap for cooperating with a drive tool, said barbed fitting drive cap integrally formed on the outer surface of the fitting body opposite the first opening at the first distal end of the first connection, coaxially with the first axis and comprising a body, a top surface and an outer surface, wherein said body having a cross-sectional width narrower than a corresponding width of the fitting body, whereby a drive force exerted from a drive tool in a direction of the first axis toward the fitting body is received at the outer surface of the fitting body; and
a second barbed fitting drive cap for cooperating with a drive tool, said second barbed fitting drive cap integrally formed on the outer surface of the fitting body opposite the second opening at the second distal end of the second connection, coaxially with the second axis and comprising a body, a top surface and an outer surface, wherein said body having a cross-sectional width narrower than a corresponding width of the fitting body, whereby a drive force exerted from the drive tool in a direction of the second axis toward the fitting body is received at the outer surface of the fitting body.

* * * * *